(12) United States Patent
Sigmon et al.

(10) Patent No.: US 12,214,658 B2
(45) Date of Patent: Feb. 4, 2025

(54) ELECTRIC AXLE WITH MULTIPLE ELECTRIC MACHINES AND LOCKING CLUTCH

(71) Applicant: Dana Automotive Systems Group, LLC, Maumee, OH (US)

(72) Inventors: Rick C. Sigmon, Bowling Green, OH (US); Andy Perakes, Canton, MI (US); Eric M. Engerman, Plymouth, MI (US)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 127 days.

(21) Appl. No.: 18/048,366

(22) Filed: Oct. 20, 2022

(65) Prior Publication Data

US 2024/0131923 A1 Apr. 25, 2024
US 2024/0227547 A9 Jul. 11, 2024

(51) Int. Cl.
*B60K 17/02* (2006.01)
*B60K 17/04* (2006.01)
*B60K 17/14* (2006.01)

(52) U.S. Cl.
CPC .......... *B60K 17/02* (2013.01); *B60K 17/046* (2013.01); *B60K 17/145* (2013.01)

(58) Field of Classification Search
CPC .... B60K 17/02; B60K 17/046; B60K 17/145; B60K 2007/0092; F16H 2048/087; F16H 2200/2094; F16H 2200/2064; F16H 2200/2005
See application file for complete search history.

(56) References Cited

U.S. PATENT DOCUMENTS

| | | | | |
|---|---|---|---|---|
| 6,085,138 | A * | 7/2000 | Smith | B60K 23/08 172/3 |
| 6,203,468 | B1 * | 3/2001 | Nitta | B60W 10/08 477/91 |
| 8,342,612 | B2 | 1/2013 | Sgherri et al. | |
| 8,640,801 | B2 | 2/2014 | Hennings et al. | |
| 8,641,568 | B2 | 2/2014 | Knoblauch et al. | |
| 10,211,702 | B2 | 2/2019 | Jahshan | |
| 11,135,914 | B2 * | 10/2021 | Glückler | B60K 1/02 |
| 11,504,286 | B2 * | 11/2022 | Cooper | F16H 7/06 |
| 2012/0221197 | A1 * | 8/2012 | Hisada | B60L 1/003 74/665 F |
| 2018/0298994 | A1 * | 10/2018 | Lian | B60K 6/387 |
| 2020/0278015 | A1 * | 9/2020 | Chu | B60K 17/046 |
| 2021/0237566 | A1 * | 8/2021 | Chopra | B60K 17/046 |
| 2022/0103046 | A1 | 3/2022 | Jahshan | |
| 2023/0010171 | A1 * | 1/2023 | Radzikh | H02K 1/182 |
| 2023/0068720 | A1 * | 3/2023 | Ima | B62D 11/04 |
| 2024/0116351 | A1 * | 4/2024 | Gurski | B60B 35/004 |

FOREIGN PATENT DOCUMENTS

EP 3020588 A2 5/2016

\* cited by examiner

*Primary Examiner* — Jacob S. Scott
*Assistant Examiner* — Farhana Pervin
(74) *Attorney, Agent, or Firm* — McCoy Russell LLP (57) ABSTRACT

Systems and methods for a lockable electric axle are provided. The electric axle includes a first electric machine coupled to a first drive wheel via a first gear set. The electric axle further includes a second electric machine coupled to a second drive wheel via a second gear set, and a locking clutch designed to selectively lock the rotation of a first rotor shaft and a second rotor shaft in the first and second electric machines, respectively.

17 Claims, 5 Drawing Sheets

ELECTRIC AXLE WITH MULTIPLE ELECTRIC MACHINES AND LOCKING CLUTCH

TECHNICAL FIELD

The present disclosure relates to an electric axle for a vehicle, and more specifically, to a locking clutch of the electric axle and clutch operating method.

BACKGROUND AND SUMMARY

Segments of the vehicle market are moving towards electrification. Vehicle platform electrification presents investment costs and project management complexity which create challenges for automotive manufacturers and suppliers. Attempts have been made to manage this complexity by carrying over certain features of an existing vehicle platform when electrifying the platform. Carry-over of these components may create packaging challenges. Specifically, features of certain hybrid powertrains and their internal combustion engine counterparts may impose space constraints on electric axles. The inventors have recognized that some electric axles do not include differentials which presents difficulties with regard to designing the axles with locking functionality.

U.S. Pat. No. 8,640,801 B2 to Hennings et al., discloses an electric axle which may present packaging challenges in certain vehicle platforms. The axle is configured as a portal axle that accommodates two motors and has a step-down gear mechanism between the respective motor and associated drive wheel. Hennings' drive apparatus further includes cardan shafts that are coupled to the step-down gear mechanisms and included in an independent suspension system.

The inventors have recognized that the use of cardan joints in an independent suspension system such as Hennings' axle decreases the axle's durability and load carrying capacity when compared to electrified rigid beam axles. Further, the motors in Hennings' electric portal axle each independently drive a distinct wheel when the drive apparatus is in operation. The drive apparatus may be unable to achieve a desired amount of traction in certain environments.

In one example, the abovementioned challenges may be at least partially overcome by an electric axle that includes a first electric machine coupled to a first drive wheel via a first gear set, and a second electric machine coupled to a second drive wheel via second gear set. The electric axle includes a locking clutch that is designed to selectively lock rotation of a first rotor shaft and a second rotor shaft of the first and second electric machines, respectively. Using a locking clutch with this arrangement allows the electric axle's functionality to be expanded to achieve increased traction during certain conditions, such as when the variance between wheel traction is relatively high. Conversely, when increased traction is not desired, the locking clutch may be unlocked and the electric machines may be independently controlled based on vehicle operating conditions. Electric axle performance may be increased as a result. Further, the electric machine and gear set architecture described above enables for efficient integration into a wide variety of vehicle platforms such as electric platforms with an internal combustion counterpart.

Additionally, in one example the first and second electric machines may be axial flux motors. Using axial flux motors in the axle allows the axle's space efficiency to be increased if desired and may specifically decrease the axle's lateral width (e.g., as measured along its axis of rotation) when compared to other motors, such as radial flux motors. The electric axle may be used in space constrained vehicle platforms such as platforms that include a support structure which form a cradle that wraps around powertrain components. Further, in one example, the first and second gear sets may be compound planetary gear sets, each with multiple sets of planet gears. One of the sets of planet gears may be positioned radially outward from the rotor shaft of the associated electric machine. In this way, the axle's compactness may be further increased, thereby expanding the axle's applicability while allowing target gear reduction ratios to be achieved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

A space-efficient electric axle with a locking clutch that locks rotation of separate motors together for enhanced tractive performance is described herein. In this way, the axle can be locked during selected conditions, such as when the vehicle is operating in variable traction environments, and then unlocked during other conditions when independent motor control is desired. As a result, the drive axle's adaptability is increased along with the axle's performance over a wider variety of operating conditions. The locking clutch may be positioned axially between the traction motors to increase axle compactness and allow the rotor shafts of the motors to be effectively locked for rotation with one another when desired. The traction motors may be axial flux electric motors to increase axle compactness and enable the incorporation of the axle into space constrained vehicle platforms. Further, gear sets that are used to rotationally couple the motors to drive wheels may be compound planetary gear sets that include planet gears that are positioned radially outward from rotor shafts of the motors. In this way, desired gear reduction ratios in the axle is achieved in a compact package, thereby increasing the axle's applicability. For instance, the axle may be incorporated into a support structure that forms a cradle which can be used in all-electric, hybrid, and internal combustion engine vehicle platforms. In the hybrid vehicle platform, the cradle wraps around engine components such as an oil pan.

Figure 1:
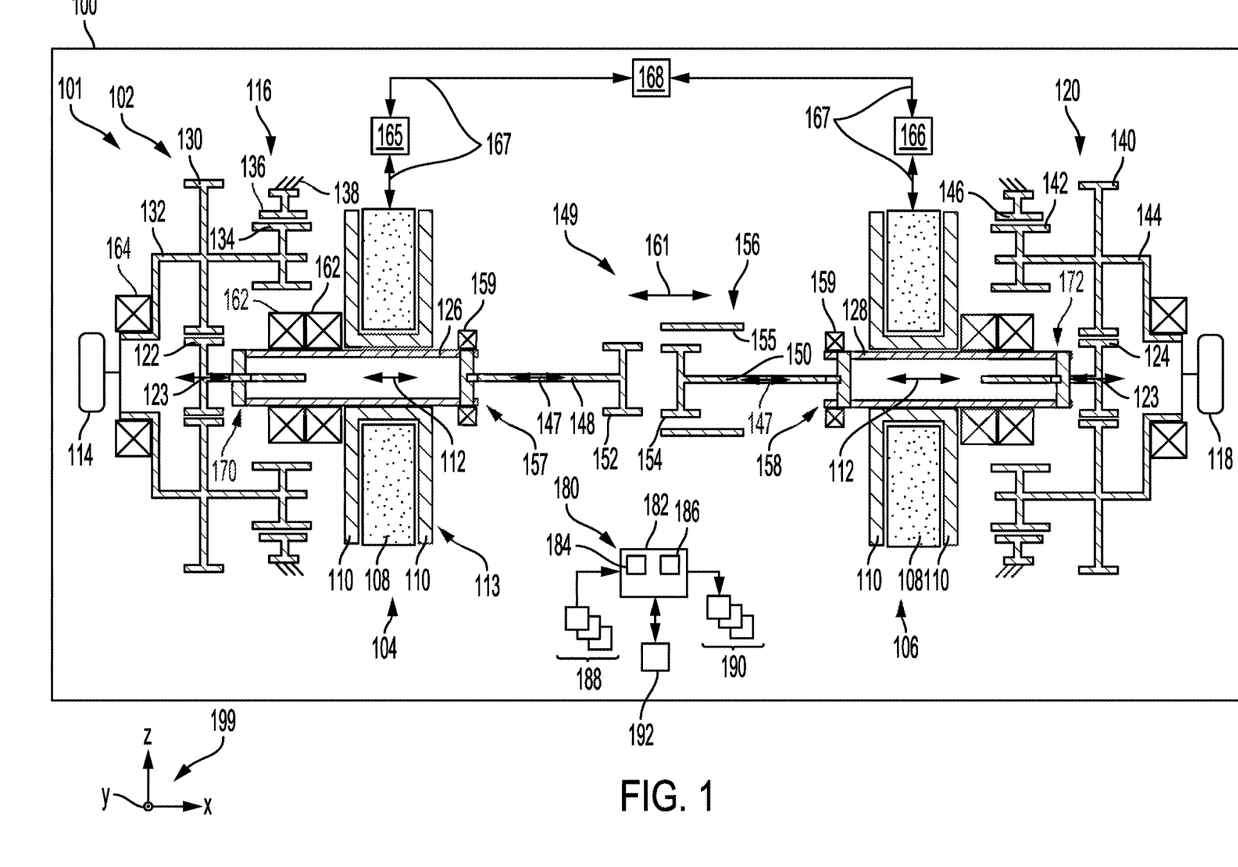
FIG. 1 shows a schematic representation of a vehicle with an electric axle.

FIG. 1 shows a schematic depiction of an electric vehicle (EV) 100 with a powertrain 101 that includes an electric axle 102. As described herein, an electric axle 102 is an electric drive incorporated into an axle. The electric axle 102 may be an electric beam axle, with mechanical components structurally supporting one another and extending between drive wheels. To elaborate, the beam axle may be a structurally continuous structure that spans the drive wheels on a lateral axis. Thus, in the beam axle embodiment, wheels coupled to the axle may move in unison when articulating, during vehicle travel on uneven road surfaces. Specifically, the camber angle of the wheels may remain substantially constant as the suspension moves through its travel. The beam axle may be coupled to a dependent suspension system, in one example. Therefore, the electric axle may be an unsprung mass.

The EV 100 may be an all-electric vehicle (e.g., a battery electric vehicle (BEV)), in one example. In an alternate example, the EV 100 may be a hybrid electric vehicle. In the hybrid vehicle embodiment an engine may be included in the powertrain and in the all-electric vehicle embodiment an engine may be omitted from the powertrain.

The electric axle 102 includes a first electric machine 104 and a second electric machine 106. As illustrated, each of the electric machines 104, 106 may specifically be designed as axial flux electric motors due to their decreased axial length and efficiency gains when compared to radial flux motors. However, other types of electric machines may be used in alternate examples, such as transverse flux motors or radial flux motors. When radial flux motors are utilized, the axle's axial length may be increased. Further, in one example, each of the electric machines 104, 106 may have a similar electromagnetic component design and sizing to increase manufacturing efficiency. In another example, electric machines with different configurations may be utilized in the electric axle 102.

The electric machines 104, 106 each include a stator 108 and rotors 113 that rotate about rotational axes 112. In the axial flux electric motor example, the rotors 113 include rotor sections 110 coupled to rotor shafts 126, 128. Specifically, in one example, rotor sections 110 of each of the electric machines 104, 106 may be positioned on opposing axial sides of the stators 108, thereby axially capturing the stator 108. Further the rotor shafts 126, 128 extend inboard and outboard from the rotor sections 110. Shaping the rotor shafts in this manner enable the motors to be spaced efficiently attached to a locking clutch 149 as well as a first gear set 116 and a second gear set 118, respectively, described in greater detail herein.

The electric axle 102 further includes the first gear set 116 and the second gear set 120 coupled to the first electric machine 104 and the second electric machine 106, respectively. The first and second gear sets 116, 120 are specifically depicted as compound planetary gear sets in the illustrated example. However, in other examples, the gear sets may be simple planetary gear sets, a different type of compound planetary gear set, or a non-epicycle gear set, for instance. As illustrated, the first gear set 116 includes a first sun gear 122 that is coupled (e.g., splined, welded, press-fit, combinations thereof, and the like) to the rotor shaft 126 at an outboard end 170 and meshes with a first set of planet gears 130 which rotate on a carrier 132. To enable the rotation between the planet gears 130 and the carrier 132 as well as the other planet gears and carriers described herein, bearings (e.g., needle roller bearings) may be positioned on the carrier 132 and designed to support and permit rotation of the corresponding planet gears.

The first gear set 116 further includes a second set of planet gears 134 that rotate on the carrier 132 and mesh with a ring gear 136. Further, the ring gear 136 is grounded via a stationary component 138 such as an axle housing, for instance. The other grounded components in the gearboxes shown in FIG. 1 as well as FIGS. 2A-2B may be grounded via the axle housing, in one example. The second set of planet gear 134 and the ring gear 136 are positioned axially between the first set of planet gears 130 and the electric machine 104, in the illustrated example. In this way, the compactness of the axle is increased by decreasing the axial length of the planetary gear set when compared to planetary gear sets that position the second set of planet gears axially outboard of the first set of planet gears. However, alternate positioning of the planetary gear set components may be used in other examples. For instance, the first gear set may be a simple planetary gear set or a planetary gear set that includes three sets of planet gears.

The carrier 132 is coupled to the drive wheel 114 and therefore functions as the output of the gear set in a drive mode while the sun gear 122 functions as the input. In this way, the electric axle may achieve a desired gear reduction. However, first the gear set 116 may be designed with alternate input and output gears, in alternate embodiments.

The second gear set 120 similarly includes a sun gear 124 that meshes with a first set of planet gears 140 that rotate on a carrier 144 that is coupled to the drive wheel 118, a second set of planet gears 142 that rotate on the carrier, and a ring gear 146 that is again grounded. The sun gear 124 is coupled to the rotor shaft 128 at an outboard end 172 of said shaft. As described herein with regard to rotating components a coupling between two component denotes that rotational energy is able to pass between these components.

The first gear set 116 and the second gear set 120 are illustrated as single-speed gearboxes. This design increases axle compactness and decreases the likelihood of component degradation, when compared to multi-speed gearboxes. However, in other examples, multi-speed gearboxes may be deployed in the electric axle which may come at the expense of compactness and durability.

The electric axle 102 includes a locking clutch 149 that is positioned axially between the first electric machine 104 and the second electric machine 106. The locking clutch 149 is designed to selectively lock rotation of the first rotor shaft 126 and the second rotor shaft 128. In a locked configuration, the axle achieves increased traction which may be particularly desirable in low or variable traction environments. Conversely, when the clutch is unlocked, the power to each drive wheel can be independently controlled for enhanced maneuvering performance.

In the illustrated example, the locking clutch 149 is a dog clutch which allows the clutch to achieve the abovementioned locking functionality. In such an example, the locking clutch 149 includes a sliding sleeve 156 with a splined interior 155 that is designed to engage a first splined interface 152 and a second splined interface 154. The first splined interface 152 is fixedly coupled to a first shaft 148 that is fixedly coupled to the rotor shaft 126. For instance, the first shaft 148 may be splined, press-fit, welded, combinations thereof, and the like to an inboard end 157 of the rotor shaft 126. Likewise, the second splined interface 154 is fixedly coupled to a second shaft 150 that is fixedly coupled to the rotor shaft 128. For example, the second shaft 150 may be splined, press-fit, welded, combinations thereof, and the like to an inboard end 158 of the rotor shaft 128. However, in another example, the locking clutch 149 may be a friction clutch which may however decrease clutch and more generally axle compactness. Still further, in another example, the locking clutch may be a sliding face dog clutch that includes axial faces with teeth that form an interference fit, when engaged. Further, the locking clutch may be hydraulically, pneumatically, and/or electromechanically actuated.

The locking clutch 149 is depicted in a disengaged configuration. In the disengaged configuration, the sliding sleeve 156 is decoupled from one or both of the first splined interface 152 and the second splined interface 154. Conversely, when the locking clutch 149 is engaged the sliding sleeve 156 mates with both the first splined interface 152 and the second splined interface 154. To transition between clutch engagement and disengaged, the sliding sleeve 156 slides axially as denoted via arrows 161.

Due to the compact configuration of the electric machines 104, 106 that is achieved via the axial flux design, the second set of planet gears 134, 142 and the ring gears 136, 146 may be positioned radially outward from the rotor shafts 126, 128, respectively and axially between the first sets of planet gears 130, 140 and the electric machines 104, 106, respectively. However, in other examples, the second sets of planet gears may be positioned outboard of the first sets of planet gears, respectively. In this way, the axle may be able to achieve target gear reduction ratios in a space efficient package.

As illustrated, bearings 159 are coupled the rotor shafts 126, 128 at or near the inboard axial ends 157 and 158 of said shafts. Sets of bearings 162 are coupled to the rotor shafts 126, 128 at or near outboard ends 170 and 172 of the shafts. Thus, the bearings are positioned on opposing axial sides of the electric machine stators 108. In this way, the rotor shafts may be supported at opposing ends via bearings that carry the expected shaft loading. The rotor shafts 126 and 128 may therefore include sections that extend inboard toward the locking clutch 149 and outboard toward the respective drive wheel. Further, bearings 164 may be coupled to the carriers 132, 144. The aforementioned bearings as well as the other bearings described herein may include components such as inner races, outer races, roller elements (e.g., balls, cylindrical rollers, tapered cylindrical rollers, and the like). It will be appreciated that the size and/or construction of the bearings may be selected based on expected rotational speeds of the components to which they are attached, expected shaft loading, packaging constraints, and the like. As such, the size and/or configuration of at least a portion of the bearings may vary, in some cases. However, at least a portion of the bearings may have similar sizes and/or constructions.

Figure 3A:
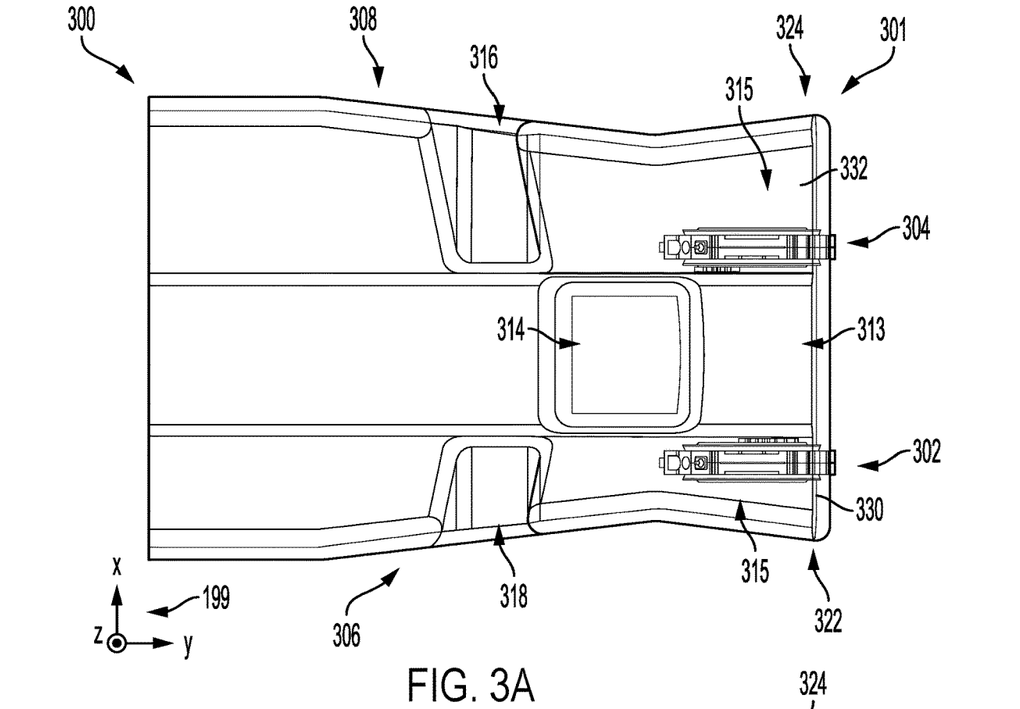
FIGS. 3A-3B show different views of a detailed illustration of a support structure example with electric machines of an electric axle incorporated therein.
Figure 3B:
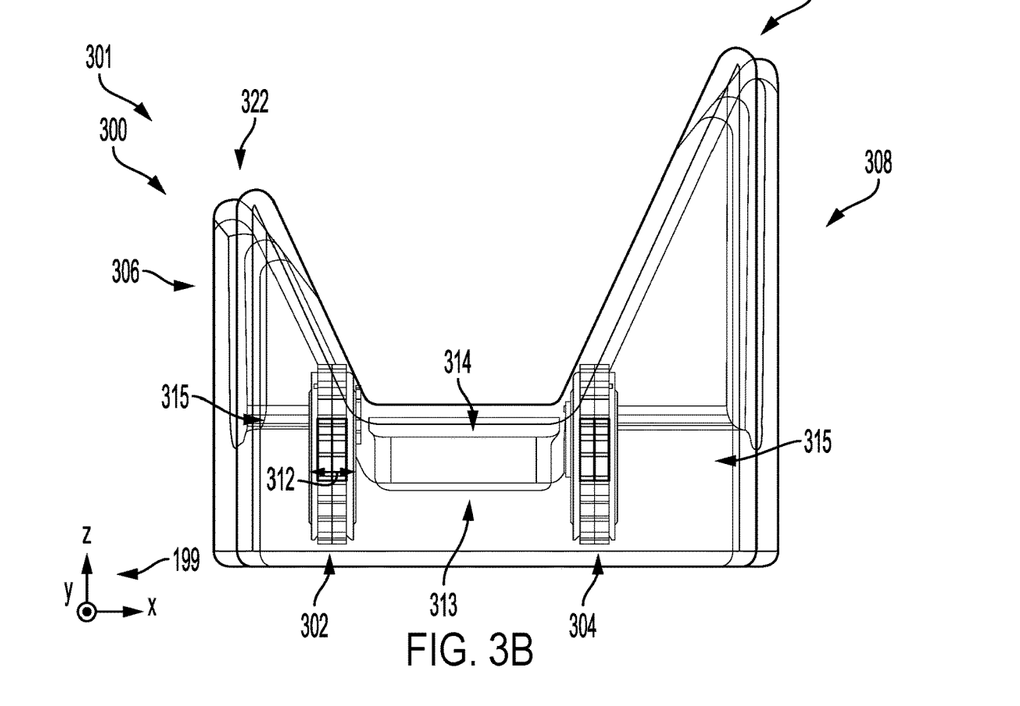

The first and second gear sets 116, 120 are illustrated as single-speed gearboxes that may enable the electric axle 102 to achieve a targeted gear ratio and desired packaging demands of a support structure 300, shown in FIGS. 3A and 3B and described in greater detail herein. However, in other examples, the gear sets may be multi-speed gearboxes.

As illustrated in FIG. 1, the first electric machine 104 and the second electric machine 106 may be electrically coupled to inverters 165, 166, respectively. These inverters 165, 166 are designed to covert direct current (DC) power to alternating current (AC) power and vice versa. As such, the electric machines 104, 106 may be AC electric machines, in one example. However, in other examples, the electric machines 104, 106 may be DC electric machines and the inverters may therefore be omitted from the powertrain 101. The inverters 165, 166 may receive electric energy from one or more energy storage device(s) (e.g., traction batteries, capacitors, combinations thereof, and the like). Arrows 167 signify the electric energy transfer between the electric machines 104, 106, the inverters 165, 166, and the energy storage device(s) 168 that may occur during different modes of system operation. As such, during a drive mode, electric energy may flow from the energy storage device(s) 168 to the electric machines 104, 106 and during a regenerative mode, electric energy may flow in the opposite direction from the electric machines 104, 106 to the energy storage device(s) 168.

The EV 100 may also include a control system 180 with a controller 182. The controller 182 includes a processor 184 and memory 186. The memory 186 may hold instructions stored therein that when executed by the processor 184 cause the controller 182 to perform the various methods, control techniques, and the like, described herein. The processor 184 may include a microprocessor unit and/or other types of circuits. The memory 186 may include known data storage mediums such as random access memory, read-only memory, keep alive memory, combinations thereof, and the like.

The controller 182 may receive various signals from sensors 188 positioned in different locations in the EV 100, the powertrain 101, and the electric axle 102. The sensors 188 may include electric machine speed sensors, energy storage device temperature sensor(s), an energy storage device state of charge sensor(s), wheel speed sensors, and the like. The controller 182 may also send control signals to various actuators 190 coupled at different locations in the EV 100, and the electric axle 102. For instance, the controller may send signals to the inverters 165, 166 to adjust the rotational speed of the electric machines 104, 106. In another example, the controller 182 may send a command signal to the locking clutch 149 and in response an actuator may engage or disengage the locking clutch. The other controllable components in the EV 100, powertrain 101, and electric axle 102 may function in a similar manner with regard to command signals and actuator adjustment.

The EV 100 may also include one or more input device(s) 192 (e.g., an accelerator pedal, a brake pedal, a console instrument panel, touch interface, touch panel, keyboard, an axle locking device (e.g., a switch, a button, a knob, and/or a touch interface), combinations thereof, and the like). The input device(s) 192, responsive to operator input, may generate an axle locking or unlocking request. In other words, the input device(s) 192 may generate a signal that is indicative of an operator's intent to lock or unlock the electric axle 102.

An axis system 199 is provided in FIG. 1, as well as FIGS. 2A-3B, for reference. The y-axis may be a vertical axis (e.g., parallel to a gravitational axis), the x-axis may be a lateral axis (e.g., horizontal axis), and/or the z-axis may be a longitudinal axis, in one example. However, the axes may have other orientations, in other examples. Rotational axes 112 of the electric machines 104, 106 and rotational axes 123, 147 of the sun gears 122, 124 and the shafts 148, 150 are further provided for reference, respectively.

Figure 2A:
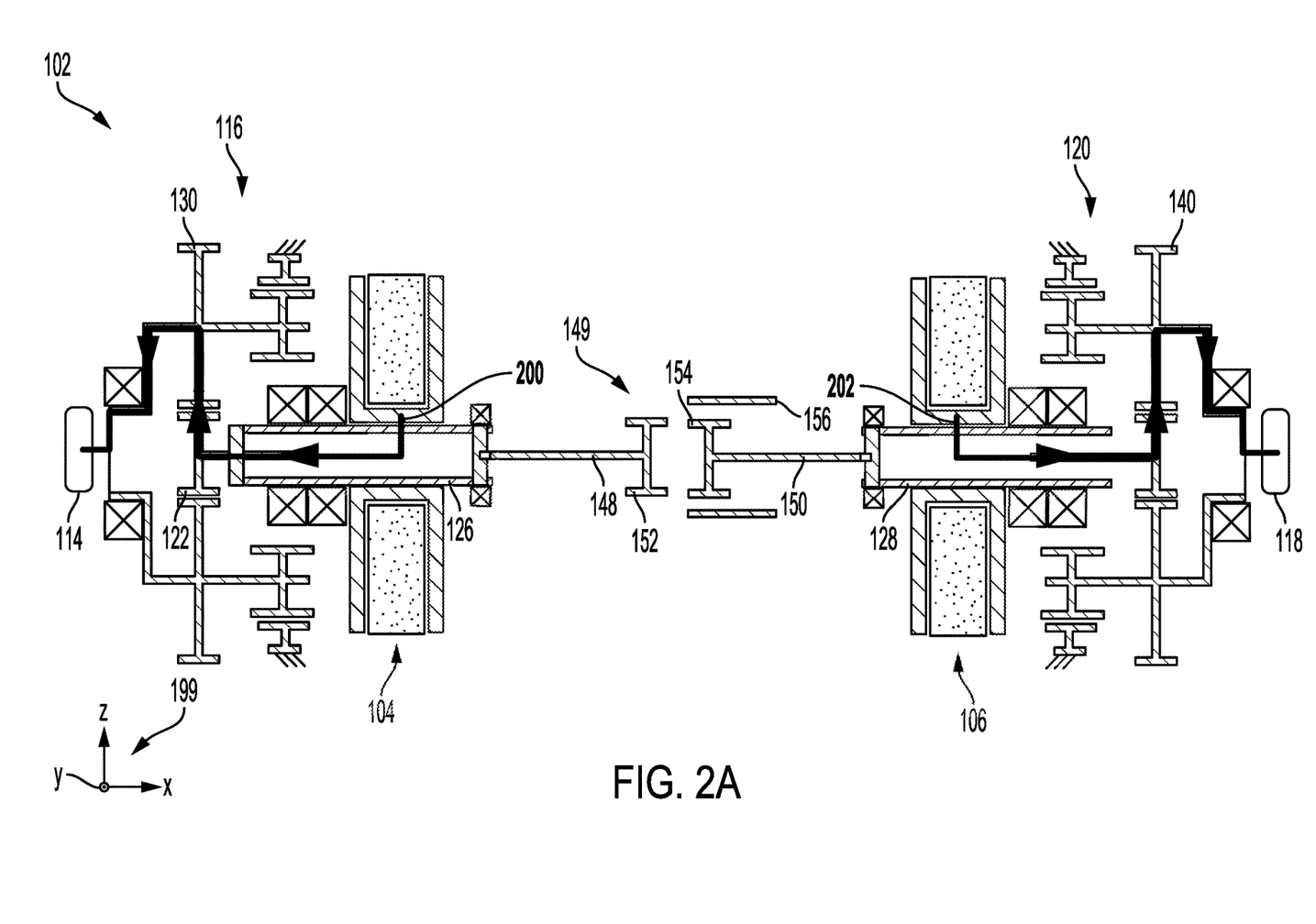
FIGS. 2A-2B show power paths for different operating conditions of the electric drive axle, depicted in FIG. 1.
Figure 2B:
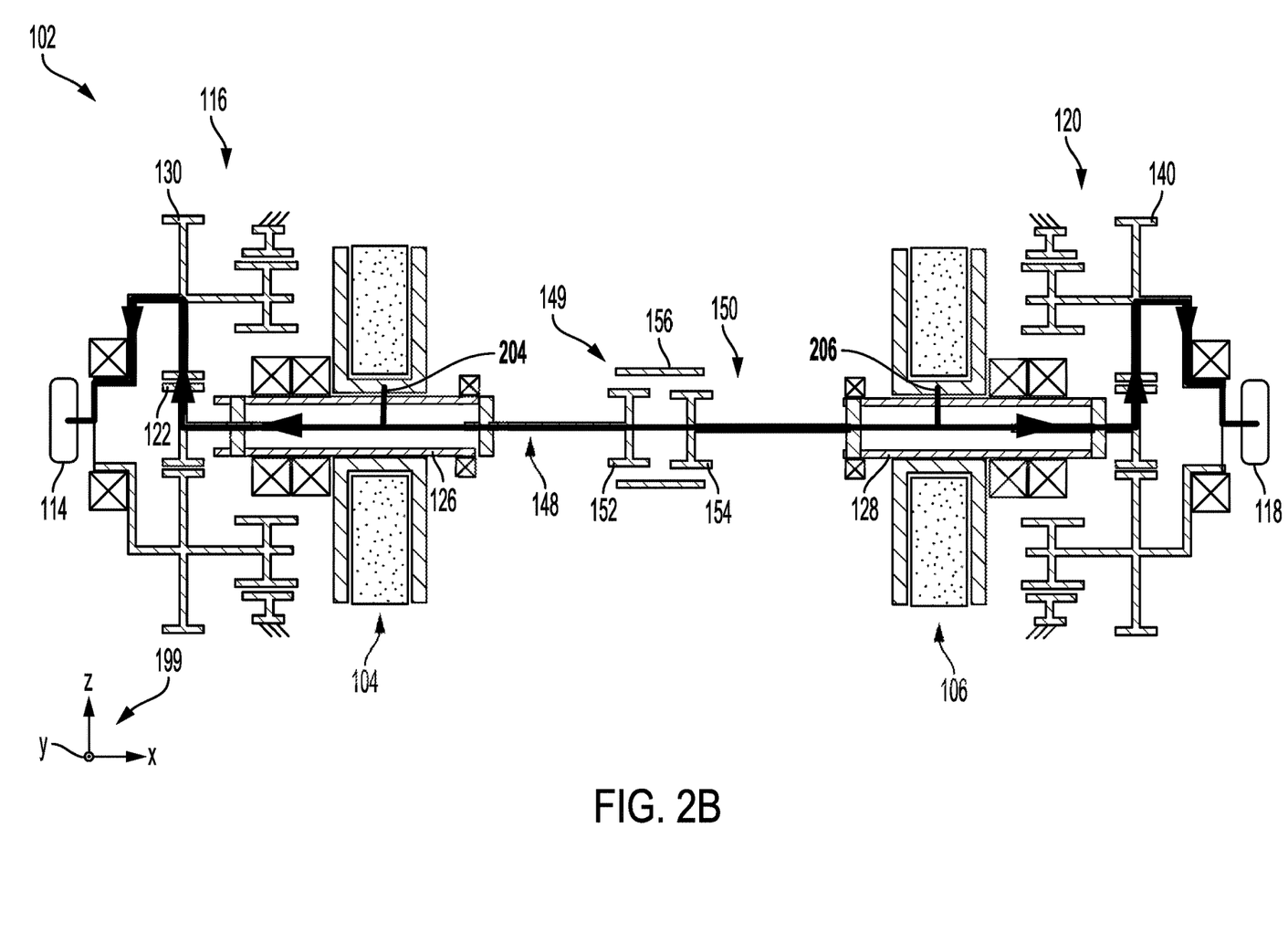

FIGS. 2A and 2B show the mechanical power paths 200, 202, 204, and 206, respectively, through the electric axle 102. The mechanical power paths 200, 202 shown in FIG. 2A occur while the electric axle is operating in an un-locked mode in which the locking clutch is disengaged. Conversely, the mechanical power paths 204, 206 shown in FIG. 2B occur while the electric axle is operating in a locked mode in which the locking clutch is engaged. Clutch engagement and disengagement may be triggered automatically or via operator input during for example operation of the vehicle in a variable traction environment.

It will be understood that the power paths depicted in FIGS. 2A and 2B generally correspond to a drive mode for the electric axle. The drive may be a forward drive mode or a reverse drive mode. Further, the electric machines 104, 106 may generate rotational output in opposite directions in the forward and reverse drive modes. In other words, in a forward drive mode, the electric machines rotate the rotor shafts in a first direction, and in a reverse drive mode, the electric machines rotate the rotor shafts in the opposite direction.

As illustrated in FIG. 2A, the locking clutch 149 is disengaged and the first and second rotor shafts 126, 128 rotate independently. The mechanical power path 200 unfolds as follows: mechanical power moves from the rotor shaft 126 of the first electric machine to the gear set 116 via the sun gear 122; from the sun gear 122 to the first set of planet gears 130; from the first set of planet gears 130 to the carrier 132; from the carrier 132 to the drive wheel 114. The power path 202 occurs in a similar manner and therefore additional discussion of the power path 202 is omitted for brevity.

As illustrated in FIG. 2B, the locking clutch 149 is engaged. During engagement, the locking clutch 149, the sliding sleeve 156 mates with the first and second splined interfaces 152, 154, resulting in the locked rotation of the first and second rotor shafts 126, 128. The mechanical power path proceeds similarly as above in FIG. 2A with the exception of the rotor shafts 126, 128 being locked and rotate dependently. Therefore, redundant description of the power path 204 and 206 are omitted for concision.

FIGS. 3A and 3B show a top view and a front view, respectively, of a support structure 300 that houses an electric axle assembly 301 with a first axial flux electric machine 302 and a second axial flux electric machine 304. Various components in the electric axle assembly have been omitted to reveal the profile of the support structure 300. These components include a locking clutch, and gear sets that are coupled to the electric machines and the drive wheels. However, it will be understood that the electric axle assembly 301 may include at least a portion of the components in the electric axle 102, shown in FIGS. 1-2B. Further, it will be understood, that the first axial flux electric machine 302 and the second axial flux electric machine 304 may be incorporated into the electric axle 102, depicted in FIG. 1, and therefore serve as examples of the first electric machine 104 and second electric machine 106, shown in FIG. 1.

The axial flux electric machines 302, 304 have comparatively shorter widths 312 (as measured along their axes of rotation) when compared to radial flux motors. The axial flux motor design therefore enables the motors to be packaged in a lower portion of the support structure 300 without undue modification. Consequently, the electric axle may pose less space constraints on surrounding components that may include, but are not limited to, powertrain components (e.g., hybrid powertrain components such as an engine and/or a transmission), suspension system components, and the like. It will be appreciated that when the electric axle components are installed in the support structure 300, a locking clutch is positioned in a lower region 313 of the support structure between the axial flux electric machines 302, 304. Further, planetary gear sets, rotationally coupled to the axial flux electric machines 302, 304 may be positioned in outboard sections 315 of the support structure.

The axial flux electric machines 302, 304 may further be positioned on laterally opposing sides of an engine recess 314. The engine recess 314 may be profiled to mate with at least a portion of an internal combustion engine such as a lubricant pan, in one specific example. Further, the axial flux electric machines 302, 204 may be positioned at least partially below vertically extending protrusions 322, 324. Consequently, the axle assembly is able to achieve greater packaging efficiency, if so desired.

Slots 316 and 318 are shown on opposing lateral sides 306, 308 of the support structure 300. The engine recess 314 may be positioned longitudinally in front of the slots 316, 318 and longitudinally behind the axial flux electric machines 302, 304.

Inner surfaces 330, 332 of the vertically extending protrusions 322, 324 may form a cradle structure that may wrap around and/or mate with other powertrain components (e.g., a lubricant pan, a transmission, and the like), as previously discussed.

Figure 4:
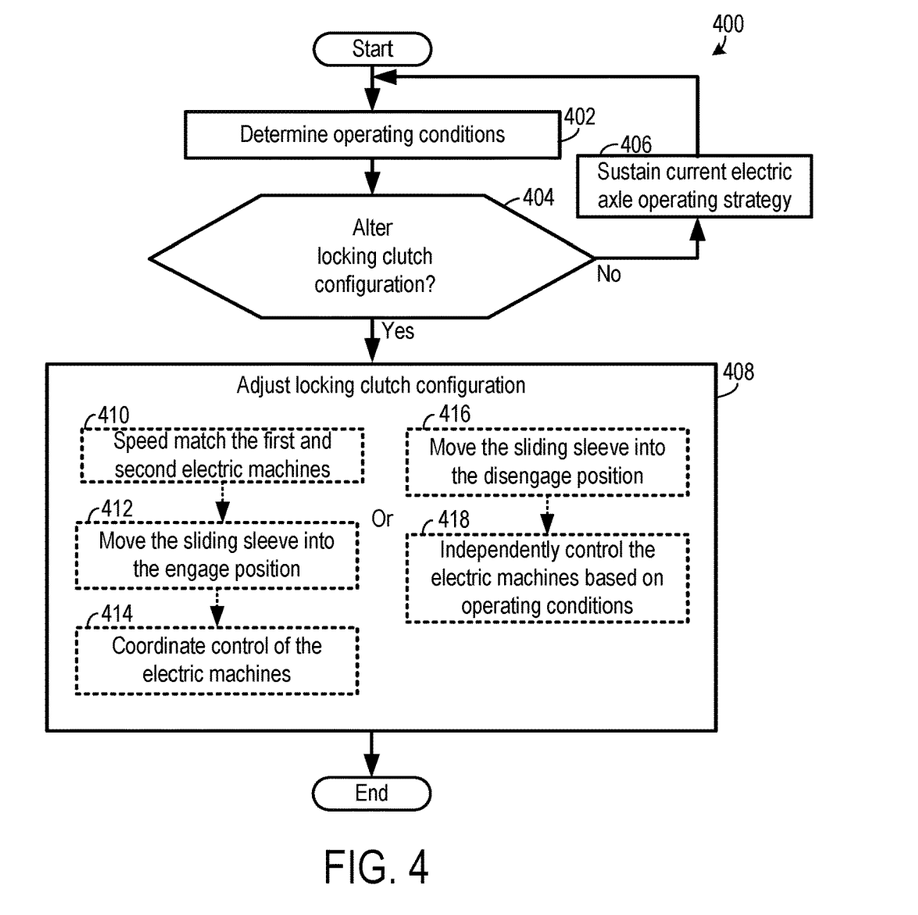
FIG. 4 shows a method for controlling an electric axle.

FIG. 4 shows a method 400 for operation of an electric axle. The method 400 specifically corresponds to operation of the electric axle 102, shown in FIGS. 1 and 2A-2B. However, the method 400 may be carried via other suitable electric drive axles, in other examples, such as the electric axle assembly 301 shown in FIGS. 3A-3B or other suitable electric axles. Furthermore, the method 400 may be implemented by a controller that includes a processor and memory, as previously discussed.

At 402, the method includes determining operating conditions. The operating conditions may include input device position (e.g., axle lock selector), gearbox speed, electric machine speeds, vehicle speed, vehicle load, ambient temperature, and the like. The operating conditions may be ascertained via sensor inputs, modeling, look-up tables, and other suitable techniques.

At 404, the method determines whether to alter the locking clutch configuration to transition the locking clutch between a locked and unlocked configuration or vice versa. Such a determination may be carried out responsive to operator input. For instance, the driver may interact with an axle lock selector (e.g., a button, switch, touch interface, and the like) or other suitable input devices to transition the electric axle into a locked mode or an unlocked mode. However, automatic locking clutch strategies may be used, in other examples. For instance, the controller may automatically transition the electric axle into the locked mode and unlocked mode based on conditions such as vehicle speed, vehicle load, wheel slip, and the like.

If it is determined that the locking clutch's configuration should not be altered (NO at 404) the method proceeds to 406. At 406, the method includes maintaining the current electric axle operating strategy. For instance, the electric axle may be maintained in the locked mode or the unlocked mode. As such, the locking clutch may be held in its current position.

If it is determined that the locking clutch's configuration should be altered (YES at 404) the method proceeds to 408. At 408, the method includes adjusting the locking clutch configuration to transition the electric axle between the locked mode and the unlocked mode or vice versa.

Step 408 may include sub-steps 410-414 or 416-418. At 410, the method includes speed matching the first and second electric machines to synchronize the speed of the first and second rotor shafts in the first and second electric machines. For instance, the first and second electric machines may be operated at different set-points prior to the initiation of the lock mode. In this scenario, the electric machines may speed controlled and brought into a desired speed range or operated around a target speed set-point. When it is confirmed that both machines have reached the desired range or set-point the locking clutch engagement is then permitted.

At 412, the method includes moving the sliding sleeve into the engaged position and at 414, coordinating control of the electric machines. For instance, both the electric machines may be controlled at or around a speed set-point or within a desired range when the axle is locked. In another example, such as when the vehicle has reached a desired speed, one of the electric machines may be speed or torque controller while operation of the other machine is discontinued.

Conversely, at 416, the method includes moving the sliding sleeve into the disengaged configuration and at 418, the method may include independently controlling the electric machines based on operating conditions. For instance, the electric machines may be controlled at different speeds based on operating conditions such as wheel slip, vehicle speed, lateral acceleration, and the like. In this way, the electric drive axle can be efficiently switched between the locking clutch engage and disengage operation to increase traction when desired.

Figure 5:
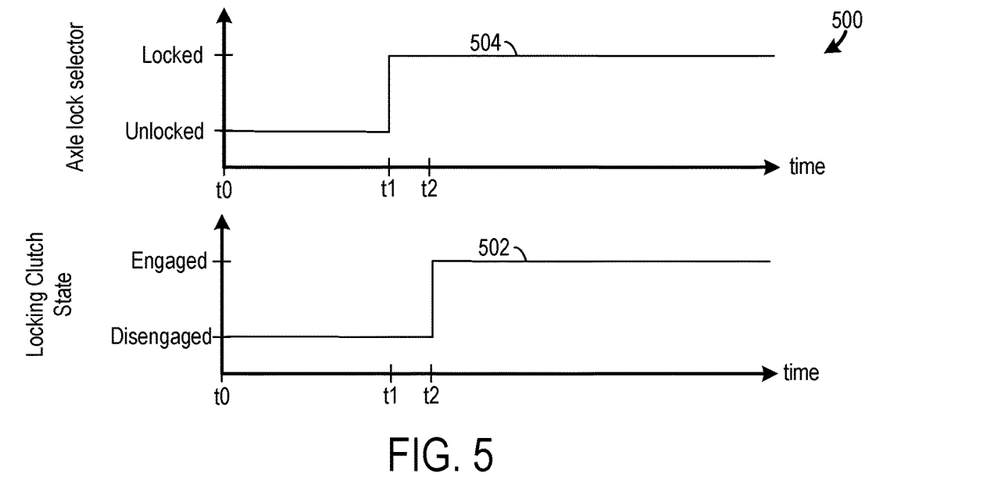
FIG. 5 shows a timing diagram of a use-case electric axle control strategy.

FIG. 5 illustrates a timing diagram 500 of a prophetic use-case control strategy for an electric axle, such as the electric axle 102 shown in FIGS. 1-2B. In each graph of the timing diagram, time is indicated on the abscissa and increases from left to right. The ordinates for plot 502 indicate the operational state of the locking clutch (i.e., "Engaged" or "Disengaged"). The ordinates for plot 504 indicate the axle lock selector position (i.e., "Locked" and "Unlocked").

From t0 to t1 the axle remains unlocked. At t1, the axle lock selector position is toggled from the unlocked position to the locked position. Responsive to the operator toggling the axle lock selector, clutch locking is initiated. Between t1 and t2 the electric machines may be speed matched and the clutch actuation may be initiated via hydraulic or hydromechanical actuators. At t2, the locking clutch is engaged and the axle is locked. As such, the electric axle is placed in a locked mode where the left and right electric machines rotate in unison. It will be appreciated that the axle transitions into the unlocked configuration in an opposite manner. In this way, the locking clutch enables the axle to function similar to a locking differential, in certain respects, thereby expanding the electric axle's adaptability. Consequently, the vehicle operator can adjust axle traction according to their predilection to increase traction.

The electric axle with the controller described above may be used to implement the drive modes discussed in the following paragraphs. Therefore, the steps in the control strategies elaborated upon in the following paragraphs may be includes in different electric axle operating methods and implemented as instructions stored in memory of the controller. For instance, in a drive mode, the locking clutch may be engaged to increase the torque delivered to one of the drive wheels. To elaborate, in such an example, one drive wheel may be slipping and the opposing drive wheel may be receiving torque from the associated motor below a target value. Responsive to determining that the aforementioned conditions are present, the locking clutch may be automatically engaged to increase the amount of torque delivered to the drive wheel that is not slipping and receiving torque below the desired value. The motors may then be jointly controlled to transfer a targeted amount of torque to the drive wheel which has traction, thereby enhancing the axle's tractive performance.

In another example, one of the motors in the electric axle may experience an over-temperature condition (e.g., a condition where the motor's temperature exceeds a threshold value that may be indicative of motor degradation). In response to determining that the motor is experiencing an over-temperature condition, the locking clutch may be engaged and the speed of the over-temperature motor may be reduced while the speed of the other motor is increased. In this way, motor control is coordinated to achieve a desired vehicle speed while taking steps to avoid operating one of the motors above a threshold temperature.

In another example, the vehicle may include two of the electric drive axles described above with regard to FIGS. 1-2B. In such an example, to implement a turn with a small radius, the locking clutches may be disengaged and the wheels on the left side may be spun in a first direction and the wheels on the right side may be spun in a second direction (opposite the first direction) to implement a tight-radius turn. During other conditions, such as when increased traction is desired, one or both of the locking clutches may be engaged and the wheels may be spun in common rotational directions by the motors. Consequently, the vehicle may be adapted to turn in very tight spaces as well as operate with increased traction depending on the vehicle's operating environment.

In yet another example, responsive to determining that one of the motor or associated inverter is inoperable, the locking clutch may be locked to enable the axle to continue to operate to propel the vehicle. In such an example, the operable motor may be speed constrained to decrease the chance of motor degradation. In this way, the electric axle may continue to operate in the case of a single motor inoperability, thereby increasing the reliability of the electric axle.

The technical effect of the electric drive axles and operating methods described herein is to expand the electric axle's functionality and increase the traction of the drive wheels in the axle during certain operating conditions.

FIGS. 3A-3B are drawn approximately to scale. However, the components may have other relative dimensions, in other embodiments.

FIGS. 1-3B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such. Even further, elements which are coaxial or parallel to one another may be referred to as such.

The invention will be further described in the following paragraphs. In one aspect, an electric axle is provided that comprises a first electric machine coupled to a first drive wheel via a first gear set, a second electric machine is coupled to a second drive wheel via a second gear set, and a locking clutch is designed to selectively lock the rotation of a first rotor shaft and a second rotor shaft in the first and second electric machines, respectively.

In another aspect, a method for operating an electric axle is provided that comprises during a first operating condition, engaging a locking clutch to lock the rotation of a first rotor shaft and a second rotor shaft in a first electric machine and a second electric machine, respectively, the first electric machine is coupled to a first drive wheel via a first gear set, and the second electric machine is coupled to a second drive wheel via second gear set.

In yet another aspect, an electric beam axle is provided that comprises a first electric machine coupled to a first drive wheel via a first gear set and a second electric machine coupled to a second drive wheel via second gear set, a locking clutch includes a first splined interface fixedly coupled to a first rotor shaft in the first electric machine, the locking clutch additionally includes a second splined interface fixedly coupled to a second rotor shaft in the second electric machine, and a sliding sleeve designed to selectively mate with the first and second splined interfaces. In one example, the method may further include, prior to engaging the locking clutch, speed matching the first and second electric machines. Further, in one example, the first operating condition may be a low traction condition.

In any of the aspects or combinations of the aspects, the electric axle may include a controller with instructions stored in memory that when executed, during a first operating condition, cause the controller to engage the locking clutch to lock rotation of the first and second rotor shafts.

In any of the aspects or combinations of the aspects, the first operating condition may be a condition in which the controller receives a signal from an input device that is indicative of an operator's intent to lock the electric axle.

In any of the aspects or combinations of the aspects, the controller may include instructions stored in the memory, that when executed cause the controller to speed match the first and second electric machines prior to engaging the locking clutch.

In any of the aspects or combinations of the aspects, the locking clutch may be a dog clutch.

In any of the aspects or combinations of the aspects, the first and second gear sets may be planetary gear sets.

In any of the aspects or combinations of the aspects, the first and second planetary gear sets may be compound planetary gear sets that includes a first sun gear and a second sun gear coupled to the first rotor shaft and the second rotor shaft, respectively; the first compound planetary gear set includes a first set of planet gear and a second set of planetary gears rotating on a first carrier; the second compound planetary gear set includes a third set of planet gear and a fourth set of planet gears coupled to a second carrier; and the second set of planetary gears is positioned radially outward from the first rotor shaft; and the fourth set of planetary gears is positioned radially outward from the second rotor shaft.

In any of the aspects or combinations of the aspects, the first and second electric machines may be axial flux electric motors.

In any of the aspects or combinations of the aspects, the electric axle may be a beam axle.

In any of the aspects or combinations of the aspects, the first and second splined interfaces may be coupled to the first and second rotor shafts on inboard sides of the first and second electric machines and a first and second gear sets are coupled to the first and second rotor shafts, respectively, on outboard sides of the first and second electric machines.

In any of the aspects or combinations of the aspects, the electric axle may further comprise a controller including instructions stored in memory that when executed during a first operating condition cause the controller to: speed match the first and second electric machines; and engage a locking clutch to lock rotation of the first and second rotor shafts.

In any of the aspects or combinations of the aspects, the first and second gear sets may be single speed compound planetary gear sets.

In any of the aspects or combinations of the aspects, the first gear set may include a first set of planet gears positioned radial outward from the first rotor shaft and the second gear set includes a second set of planet gears that is positioned radially outward from the second rotor shaft.

In any of the aspects or combinations of the aspects, the first set of planet gears may mesh with a first ring gear and the second set of planet gears meshes with a second ring gear; and wherein the first and second ring gears are grounded via an axle housing.

In any of the aspects or combinations of the aspects, the electric axle may further comprise a support structure that includes a first vertically extending protrusion and a second vertically extending protrusion and wherein the first electric machine is an axial flux motor that is positioned at least partially below the first vertically extending protrusion and wherein the second electric machine is an axial flux motor that is positioned at least partially below the second vertically extending protrusion.

In any of the aspects or combinations of the aspects, the locking clutch may be engaged in response to a decrease in axle traction.

In another representation, an electric drive beam axle is provided that includes mirrored drives with axial flux motor-generators and planetary gear reductions and a locking clutch interposed by the axial flux motor-generators, wherein the locking clutch is designed to lock rotor shafts in the axial flux electric motor-generators for rotation in unison.

Note that the example control and estimation routines included herein can be used with various powertrain, electric drive, and/or vehicle system configurations. The control methods and routines disclosed herein may be stored as executable instructions in non-transitory memory and may be carried out by the control system including the controller in combination with the various sensors, actuators, and other electric drive and/or vehicle hardware in combination with the electronic controller. As such, the described actions, operations, and/or functions may graphically represent code to be programmed into non-transitory memory of the computer readable storage medium in the vehicle and/or driveline control system. The various actions, operations, and/or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated actions, operations and/or functions may be repeatedly performed depending on the particular strategy being used. One or more of the method steps described herein may be omitted if desired.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to powertrains that include different types of propulsion sources including different types of electric machines and/or internal combustion engines. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electric axle comprising:
   a first axial flux electric motor coupled to a first drive wheel via a first gear set;
   a second axial flux electric motor coupled to a second drive wheel via second gear set; and
   a locking clutch designed to selectively lock rotation of a first rotor shaft and a second rotor shaft in the first and second axial flux electric motors, respectively;
   wherein each of the first axial flux electric motor and the second axial flux electric motor include rotor sections position on opposing axial sides of a stator; and
   wherein the first and second splined interfaces are coupled to the first and second rotor shafts on inboard sides of the first and second electric machines and a first and second gear sets are coupled to the first and second rotor shafts, respectively, on outboard sides of the first and second electric machines.

2. The electric axle of claim 1, further comprising a controller including instructions that when executed, during a first operating condition, cause the controller to:
   engage the locking clutch to lock rotation of the first and second rotor shafts.

3. The electric axle of claim 2, wherein the first operating condition is a condition in which the controller receives a signal from an input device that is indicative of an operator's intent to lock the electric axle.

4. The electric axle of claim 2, wherein the controller includes instructions that when executed cause the controller to:
   speed match the first and second axial flux electric motors prior to engaging the locking clutch.

5. The electric axle of claim 1, wherein the first and second gear sets are planetary gear sets.

6. The electric axle of claim 5, wherein:
   the first and second planetary gear sets are compound planetary gear sets that includes a first sun gear and a second sun gear coupled to the first rotor shaft and the second rotor shaft, respectively;
   the first compound planetary gear set includes a first set of planet gear and a second set of planetary gears rotating on a first carrier;
   the second compound planetary gear set includes a third set of planet gear and a fourth set of planet gears coupled to a second carrier;
   the second set of planetary gears is positioned radially outward from the first rotor shaft; and
   the fourth set of planetary gears is positioned radially outward from the second rotor shaft.

7. The electric axle of claim 1, wherein the electric axle is a beam axle.

8. A method for operating an electric beam axle, comprising:
   engaging a locking clutch to lock rotation of a first rotor shaft and a second rotor shaft in a first electric machine and a second electric machine, respectively;
   wherein the electric beam axle includes:
      the first electric machine coupled to a first drive wheel via a first gear set;
      the second electric machine coupled to a second drive wheel via second gear set; and
      a locking clutch including:
         a first splined interface fixedly coupled to the first rotor shaft in the first electric machine;
         a second splined interface fixedly coupled to the second rotor shaft in the second electric machine; and
         a sliding sleeve designed to selectively mate with the first splined interface and the second splined interface;
      wherein the first and second splined interfaces are coupled to the first and second rotor shafts on inboard sides of the first and second electric machines and a first and second gear sets are coupled to the first and second rotor shafts, respectively, on outboard sides of the first and second electric machines.

9. The method of claim 8, further comprising, prior to engaging the locking clutch, speed matching the first and second electric machines.

10. The method of claim 8, wherein the locking clutch is engaged in response to a decrease in axle traction.

11. An electric beam axle comprising:
   a first electric machine coupled to a first drive wheel via a first gear set;
   a second electric machine coupled to a second drive wheel via second gear set; and
   a locking clutch including:
      a first splined interface fixedly coupled to a first rotor shaft in the first electric machine;
      a second splined interface fixedly coupled to a second rotor shaft in the second electric machine; and a sliding sleeve designed to selectively mate with the first splined interface and the second splined interface;

wherein the first and second splined interfaces are coupled to the first and second rotor shafts on inboard sides of the first and second electric machines and a first and second gear sets are coupled to the first and second rotor shafts, respectively, on outboard sides of the first and second electric machines.

12. The electric beam axle of claim 11, further comprising a controller including instructions that when executed, during a first operating condition, cause the controller to:
speed match the first and second electric machines; and
engage the locking clutch to lock rotation of the first and second rotor shafts.

13. The electric beam axle of claim 11, wherein the first and second gear sets are single speed compound planetary gear sets.

14. The electric beam axle of claim 13, wherein the first gear set include a first set of planet gears positioned radial outward from the first rotor shaft and the second gear set includes a second set of planet gears that is positioned radially outward from the second rotor shaft.

15. The electric beam axle of claim 14, wherein the first and second electric machines are axial flux motors.

16. The electric beam axle of claim 14, wherein:
the first set of planet gears mesh with a first ring gear and the second set of planet gears mesh with a second ring gear; and
the first and second ring gears are grounded via an axle housing.

17. The electric beam axle of claim 11, further comprising a support structure that includes a first vertically extending protrusion and a second vertically extending protrusion and wherein the first electric machine is an axial flux motor that is positioned at least partially below the first vertically extending protrusion and wherein the second electric machine is an axial flux motor that is positioned at least partially below the second vertically extending protrusion.

* * * * *